(12) United States Patent
Santinanavat et al.

(10) Patent No.: US 7,296,595 B2
(45) Date of Patent: Nov. 20, 2007

(54) ADJUSTABLE FLOW RATE VALVE

(75) Inventors: Mike C. Santinanavat, St. Louis, MO (US); Mark H. Stark, St. Louis, MO (US); Ryan D. Jensen, St. Louis, MO (US); Donald L. Blessing, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 5 days.

(21) Appl. No.: 11/315,908

(22) Filed: Dec. 22, 2005

(65) Prior Publication Data

US 2006/0197043 A1    Sep. 7, 2006

Related U.S. Application Data

(60) Provisional application No. 60/649,628, filed on Feb. 2, 2005.

(51) Int. Cl.
*F16K 31/04* (2006.01)
(52) U.S. Cl. .................. 137/614.19; 251/285; 251/303; 251/129.15; 251/92
(58) Field of Classification Search .................. 251/92, 251/285, 284, 129.15, 129.2, 298, 303, 340, 251/336, 337, 286; 137/614.19
See application file for complete search history.

(56) References Cited

U.S. PATENT DOCUMENTS

| | | | | |
|---|---|---|---|---|
| 1,472,788 A | * | 11/1923 | Brotz | 251/129.2 |
| 1,786,063 A | * | 12/1930 | Gumpper | 251/129.21 |
| 3,665,958 A | * | 5/1972 | Dunkelis | 251/337 |
| 4,366,678 A | * | 1/1983 | Yamazaki et al. | 251/129.15 |
| 5,169,121 A | * | 12/1992 | Blanco et al. | 251/129.12 |
| 5,738,467 A | * | 4/1998 | Aidlin et al. | 251/288 |
| 6,283,115 B1 | | 9/2001 | Dempsey et al. | 126/110 |

\* cited by examiner

*Primary Examiner*—Kevin Lee
(74) *Attorney, Agent, or Firm*—Harness, Dickey & Pierce, P.L.C.

(57) ABSTRACT

A flow valve that provides for control of a fluid flow rate utilizing a first open position and a second open position. Various embodiments of a flow valve having an inlet, an outlet, and a passageway therebetween are provided that comprise a damper element pivotally arranged within the passageway that is movable between a first position in which fluid flow through the passageway is substantially unaffected by the damper element, and at least a second position in which fluid flow through the passageway is substantially reduced by the damper element. An adjustable stop is further provided for adjustably limiting the movement of the damper element to establish the second position of the damper. A moveable operator is provided for moving the damper element between the first position and second position.

10 Claims, 6 Drawing Sheets

ADJUSTABLE FLOW RATE VALVE

CROSS REFERENCE TO RELATED APPLICATIONS

This application claims the benefit of U.S. Provisional Application No. 60/649,628, filed Feb. 2, 2005, the disclosure of which is incorporated herein by reference.

FIELD OF THE INVENTION

The present invention relates to fluid flow control valves, and more particularly to flow control between a high flow rate and a reduced flow rate of fluid through a valve.

BACKGROUND OF THE INVENTION

Throttle valves typically provide for fluid flow rate control by establishing a first open state and a second open state in which a restrictor orifice is used to provide a relatively high resistance to fluid flow through the throttle valve. Such throttling valves often employ a first flow path through a first valve opening, and a second flow path through a restrictor orifice which establishes a restricted flow rate when the first valve opening is closed. However, while the second restricted open state produces a relatively high resistance to flow to provide a desired reduced flow rate through the valve, the first open state still produces a relatively low resistance to flow through the valve such that the first open state still affects fluid flow through the throttle valve.

SUMMARY

The present invention relates to a flow valve that controls fluid flow rate utilizing a first open position and a second open position. In accordance with one embodiment of the present invention, various embodiments of a flow valve having an inlet, an outlet, and a passageway therebetween are provided that comprise a damper element pivotally arranged within the passageway. The damper element is movable between a first position in which fluid flow through the passageway is substantially unaffected by the damper element, and a second position in which fluid flow through the passageway is substantially reduced by the damper element. An adjustable stop is further provided for adjustably limiting the movement of the damper element to establish the second position of the damper element. The various embodiments of a flow valve further comprise a movable operator for enabling movement of the damper element between the first position and at least a second position. A spring may be provided for biasing the damper element.

In accordance with another aspect of the present invention, some embodiments provide for a flow valve in combination with a gas valve, to establish first and second fluid flow rates through the flow valve in combination with the gas valve. In such embodiments, a flow valve having an inlet, an outlet, and a passageway therebetween comprises a damper element pivotally arranged within the passageway, where the damper element is movable between a first position and at least a second position. The first position establishes a first fluid flow rate through the passageway that is substantially unaffected by the damper element, and the second position establishes a second fluid flow rate through the passageway that is substantially reduced by the damper element. An adjustable stop is further provided for adjustably limiting the movement of the damper element to establish the second position of the damper element. The flow valve further comprise a movable operator for enabling movement of the damper element between the first position and at least a second position. A spring may be provided for biasing the damper element. Thus, some embodiments provide for a flow valve in combination with a gas valve, where the inlet of the flow valve is in connection with the outlet of the gas valve such that fluid flow through the gas valve and flow valve may be controlled to provide at least two flow rates.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
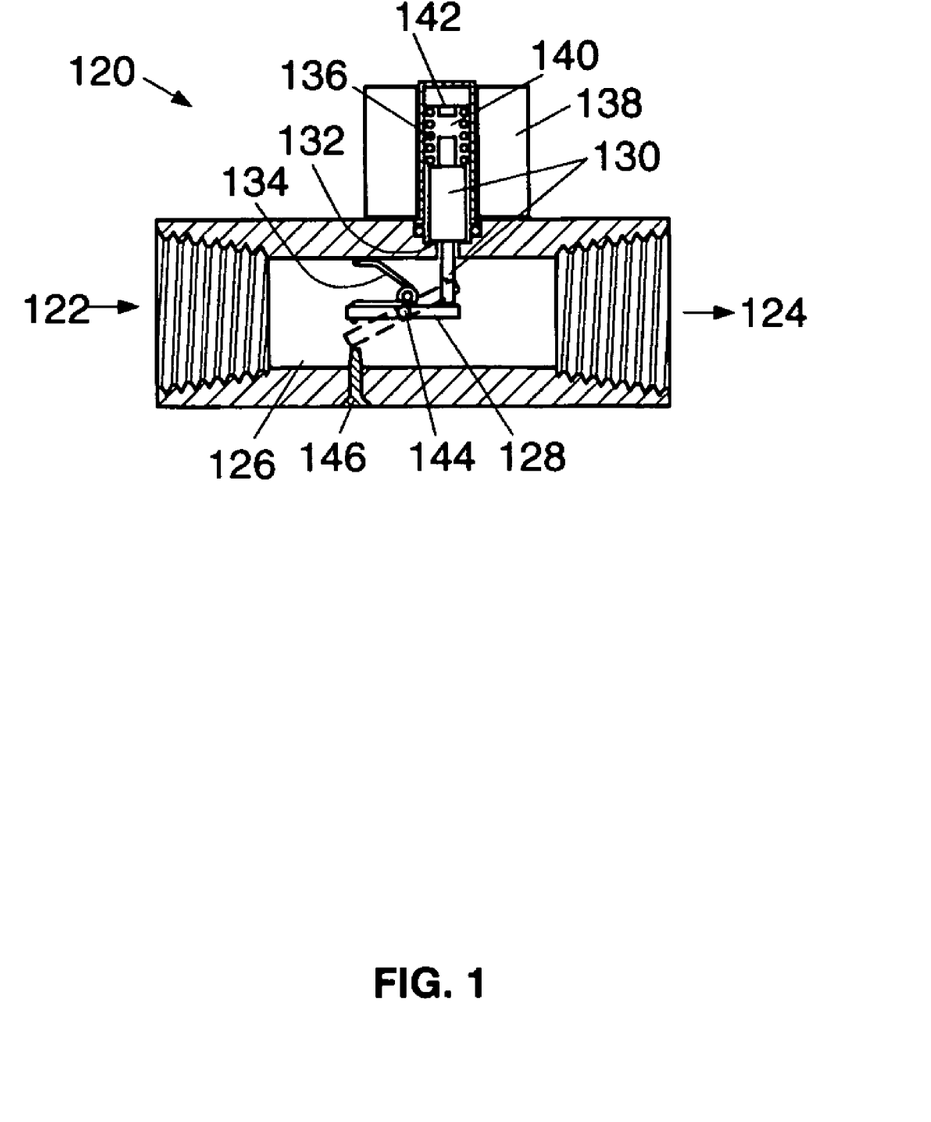
FIG. 1 is a cross-sectional side view of one embodiment of a flow valve in accordance with the principles of the present invention.

One embodiment of a flow valve in accordance with the principles of the present invention is generally shown as 120 in FIG. 1. The flow valve 120 has an inlet 122, an outlet 124, and a passage way 126 therethrough. The flow valve 120 further comprises a damper element 128 pivotally arranged within the passageway 126 that is movable between a first position in which fluid flow through the passageway is substantially unaffected by the damper element, and a second position in which fluid flow through the passageway is substantially reduced by the damper element.

In the embodiment of a flow valve shown in FIG. 1, a solenoid 130 is provided for engaging the damper element 128, wherein the solenoid 130 when operated permits movement of the damper element 128 to its second position shown as a dashed line in FIG. 1. When the solenoid is not operated or actuated, the solenoid operator or shaft 130 engages the damper element 128 for establishing a first position of the damper element 128. Specifically, the flow valve 120 comprises a stop 132 to establish a travel limit for the solenoid operator 130 when the solenoid is not being operated. When against the stop 132, the solenoid operator 130 engages the damper element 128 for establishing a first position of the damper element 128. A spring 134 can be utilized to bias the damper element 128 against the solenoid operator 130 in the first position. In this embodiment, the spring 134 is a torsion spring configured to be secured to the damper element 128, and to contact an inner surface of the flow valve 120 to bias the damper element against the solenoid shaft 130. Of course, instead of a torsion spring 134, some other biasing means can be provided such as a leaf spring. The flow valve 120 comprises a second spring 136 for returning the solenoid shaft 130 to a position in engagement with the stop 132 and the damper element 128 for establishing the first position of the damper element when the solenoid is not being operated. Thus, the flow valve 120 provides for a damper element that is held in a first position that is generally parallel with the passage way 126 through the valve, such that the resulting first flow rate through the valve is substantially unaffected when the valve is in this first open position.

When the coil 138 is energized, the solenoid shaft 130 is operated or movable in a direction towards an air gap 140 and a core 142. When operated, the solenoid shaft 130 compresses the spring 136 as it moves to a second position against the core 142, and movement of the solenoid shaft 130 permits rotation of the damper element 128 about a rotation pin 144 towards the position represented by the dashed lines in FIG. 1. The torsion spring 134 biases the damper element 128 against the solenoid shaft 130 as the solenoid shaft moves, thus permitting the damper element to pivot as the solenoid is operated. When the solenoid is actuated, the solenoid shaft moves up against the core 142, and the torsion spring 134 rotates the damper element 128 to follow the shaft 130 to establish an adjustable second position of the damper element 128. Thus, a substantially lower second flow rate through the valve is produced when the damper element 128 is in the second open position.

In an alternate construction of the first embodiment of a flow valve 120, the flow valve further comprises a stop 146 for limiting the rotation of the damper element 128 to establish the second position. When the solenoid 130 is operated, the solenoid shaft 130 moves upward against the core 132. The torsion spring 134 biases the damper element 128 against the solenoid shaft 130 as the solenoid shaft moves upward, thus permitting the damper element to pivot as the solenoid is operated. An adjustable stop 146 is provided for adjustably limiting the movement of the damper element 128 to establish an adjustable second position of the damper element 128. In this alternate construction, the adjustable stop 146 is a screw that may be adjusted to vary the maximum amount of rotation of the damper element 128. The screw 146 may be adjusted to change the second position of the damper element 128 to vary the amount of restriction of fluid flow through the valve as desired.

When the solenoid of the first flow valve embodiment is not operated, a stop 132 establishes a travel limit for the solenoid shaft when the solenoid 130 is not being operated. When against the stop 132, the solenoid shaft 130 engages the damper element 128 for establishing a first position of the damper element 128. A spring 134 can be utilized to bias the damper element 128 against the solenoid shaft 130 in the first position. The spring 134 is a torsion spring configured to be secured to the damper element 128, and to contact an inner surface of the flow valve 120 to bias the damper element against the solenoid shaft 130. The flow valve 120 comprises a second spring 36 for biasing the solenoid shaft 130 to a position in engagement with the stop 132 and the damper element 128 for establishing the first position of the damper element when the solenoid is not being operated. The flow valve 120 provides for a damper element that is held in a first position that is generally parallel with the passage way 126 through the valve, such that the resulting first flow rate through the valve is substantially unaffected when the valve is in this first open position. Thus, the flow rate of about 3.5 inches of water exiting the gas valve (such as gas valve 450 shown in FIG. 4) is substantially unaffected such that a first flow rate of 3.5 inches of water pressure is provided when the damper element is in the first position. Alternatively, the flow rate may be substantially unaffected such that the flow rate through the valve is not reduced by more than that which may be noticeably measured, such as 0.1 inches of water pressure. Unlike other throttle valves that produce a relatively low resistance to flow through the valve, the present valve does not necessitate readjustment of the gas valve pressure setting to allow for the relatively low resistance of a throttle valve. The design of this embodiment in its most open position allows the flow valve 120 to be used in combination with a gas valve, such that the flow rate is substantially unaffected and does not require any readjustment of the gas valve's outlet pressure or flow rate settings.

When the coil 138 is energized, the solenoid shaft 130 is operated or movable in a direction towards an air gap 140 and a core 142. When operated, the solenoid shaft 130 compresses the spring 136 as it moves to a second position against the core 142, and movement of the solenoid shaft 130 permits movement of the damper element 128 towards the position shown in dashed lines in FIG. 1. The torsion spring 134 biases the damper element 128 against the solenoid shaft 130 as the solenoid shaft moves, thus permitting the damper element 128 to pivot as the solenoid is operated. The screw 146 may be adjusted to change the second position of the damper element 128 to vary the amount of restriction of fluid flow through the valve as desired. Thus, a substantially lower adjustable second flow rate through the valve is produced when the valve 120 is in this second open position. When used in combination or connection with a gas valve, this second flow rate may be adjusted to provide a flow rate in the range of 1.4 inches of water pressure to 2.9 inches of water pressure.

Figure 2:
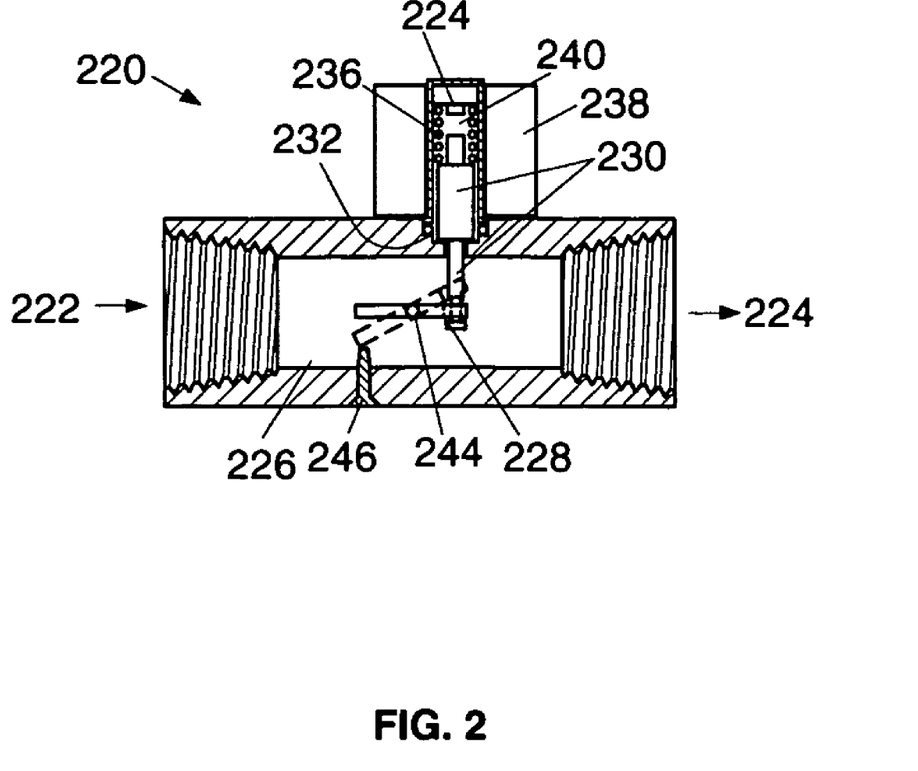
FIG. 2 is a cross-sectional side view of a second embodiment of a flow valve in accordance with the principles of the present invention.

In a second embodiment of the present invention, a flow valve 220 is provided that comprises an inlet 222, an outlet 224, and a passageway 226 therebetween as shown in FIG. 2. The flow valve 220 further comprises a damper element 228 that is pivotally arranged within the passageway 226, as in the first embodiment. The flow valve 220 further comprises a solenoid shaft 230 is biased by a spring of the solenoid towards the damper element 228 to hold the damper element 228 in a first open position as shown in FIG. 2. However, in the second embodiment, the solenoid shaft 230 is generally coupled to the damper element 228, such that the solenoid when operated causes the damper element to rotate without the biasing of the torsion spring 134. The solenoid shaft preferably comprises a head on the end of the shaft that is configured to slidably engage an opening or slot in the damper element 228, such that the head may engage the damper element 228 while the shaft slides through the slot in the damper element 228 as shown in FIG. 2. In the second embodiment, the flow valve 220 functions exactly the same as in the first embodiment, without the torsion spring 134.

Figure 3A:
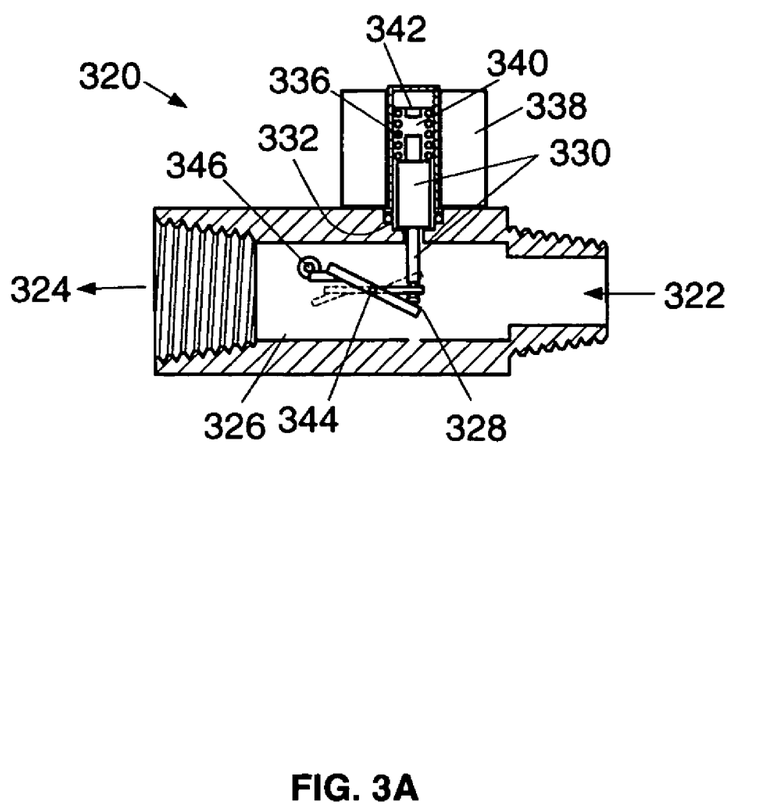
FIG. 3A is a cross-sectional side view of a third embodiment of a flow valve in accordance with the principles of the present invention.
Figure 3B:
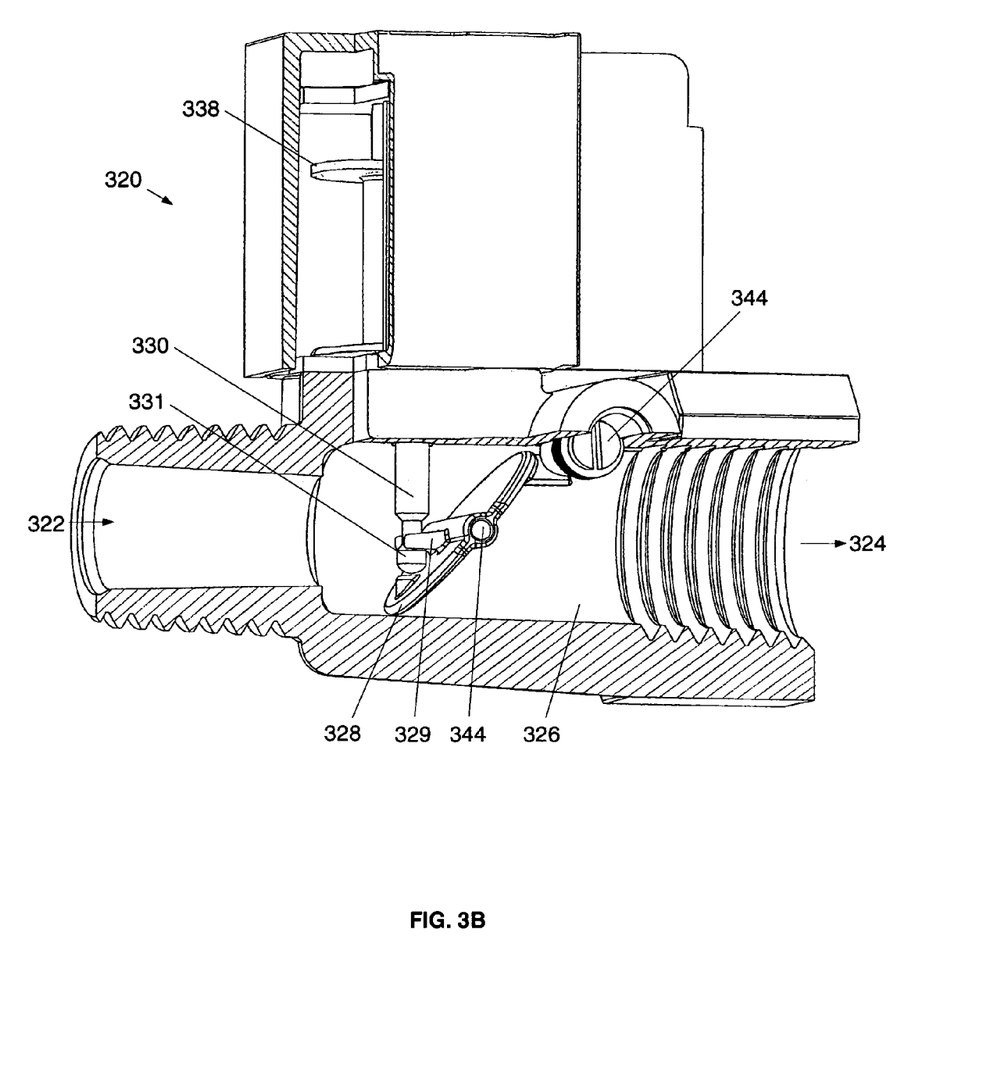
FIG. 3B is a cross-sectional perspective view of a third embodiment of a flow valve.

In a third embodiment of the present invention as shown in FIGS. 3A and 3B, a flow valve 320 is provided that comprises an inlet 322, an outlet 324, and a passageway 326 therebetween. The flow valve 320 further comprises a damper element 328 that is pivotally arranged within the passageway 326, as in the first embodiment. The flow valve 320 further comprises a solenoid operator or shaft 330 that when not operated engages the damper element 328 to hold the damper element 328 in a first open position as shown in FIG. 3. In the third embodiment, the damper element 328 in this first open position provides substantial resistance to the fluid flow to provide a first substantially reduced flow rate through the flow valve 320. Thus, this embodiment of a flow valve 320 is normally in a first restricted flow rate position when the solenoid is not being actuated or operated. This first restricted flow rate is also adjustable by adjustment means 346, which varies the resistance by adjusting the angle of the damper element 328 may pivot to. When the solenoid 330 is actuated, the solenoid shaft 330 that is coupled to the damper element 328 moves and causes the damper element 328 to rotate to a generally horizontal second open position shown by the dashed lines in FIG. 3. Thus, this embodiment of a flow valve 320 provides a second flow rate through the valve that is substantially unaffected when the solenoid is operated to establish the second open position.

Referring to FIG. 3B, the damper element 328 of the third embodiment is shown in more detail. The end portion of the solenoid operator or shaft 330 preferably comprises a tapered portion and a head 331. The solenoid operator 330 is configured to be slidably received within an opening or space between two protruding portions 329 of the damper element 328. When the solenoid is not energized or operated, the head 331 on the solenoid operator 330 is configured to engage and hold the damper element 328 in a first restricted flow position as shown in FIG. 3. When the solenoid is energized, the head 331 moves upwards and engages the protruding portions 329 of the damper element 328, to pivot or rotate to the damper element 328 to a generally horizontal second position. The flow rate through the valve is substantially unaffected when the solenoid is operated to establish the second open position.

Figure 4:
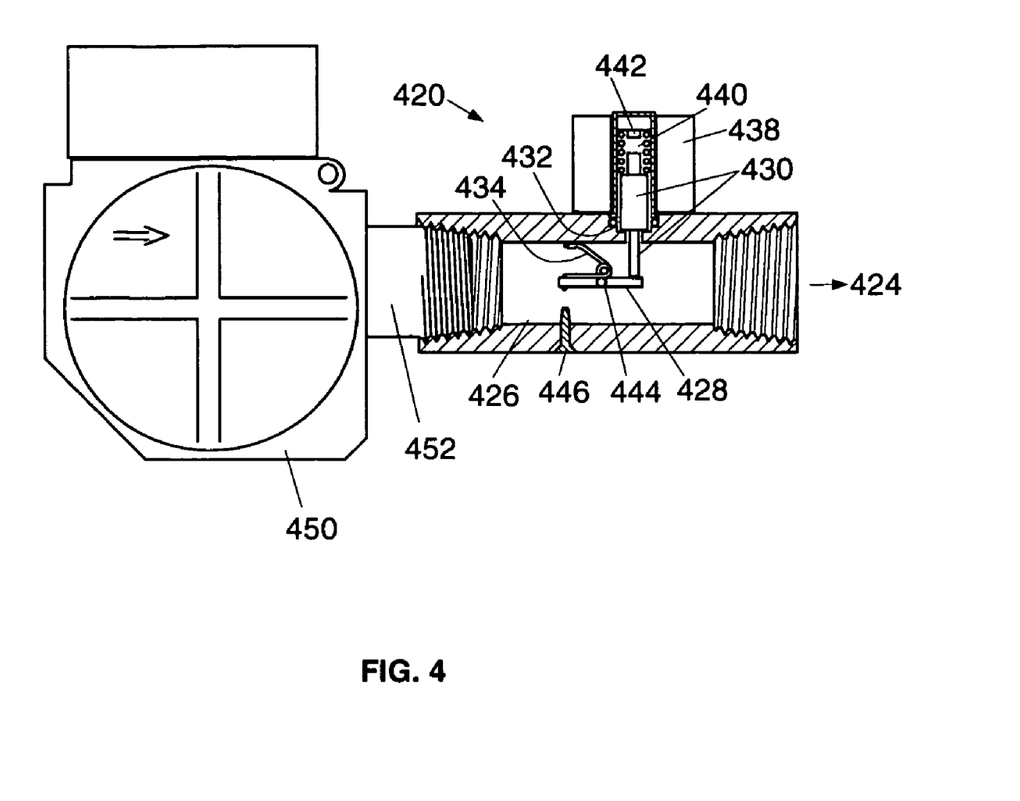
FIG. 4 is a side view of a fourth embodiment of a flow valve in combination with a gas valve in accordance with the principles of the present invention.

In a fourth embodiment of the present invention shown in FIG. 4, a flow valve 420 in combination with a gas valve 450 is provided to produce at least two fluid flow rates through the gas valve 450 and flow valve 420 in accordance with the principles of the present invention. It should be noted that the flow valve 420 may comprise any one of the flow valve embodiments described herein, or other embodiments within the scope of the invention. In this embodiment of a flow valve in combination with a gas valve 450, the inlet of the flow valve 420 is in connection with the outlet of the gas valve 450. The inlet 422 of the flow valve 420 may comprise internal threads for receiving a threaded fitting 452. Alternatively, the inlet comprise external threads (as shown in FIGS. 3A and 3B) for threadably connecting directly to the outlet of the gas valve 450 as shown in FIG. 4. The inlet could alternatively comprise a flange mount for mounting the inlet of the valve 400 directly to the outlet of a gas valve. An example of a gas valve having a threaded outlet of this type that may be utilized in combination with the flow valve 420 is a 36G03 gas valve manufactured by White-Rodgers, a Division of Emerson Electric Co. Such a valve is adjusted to have a single outlet flow rate of about 3.5 inches of water pressure when switched to an open state. Thus, the flow valve 420 in combination with the gas valve 450 permits fluid flow through both the flow valve 420 and gas valve 450 when the gas valve 450 is in an open state. Furthermore, the flow valve 420 provides for a first flow rate and at least a second substantially reduced flow rate at the outlet of the flow valve, to provide at least two stage flow through the gas valve 450 and flow valve 420 combination.

In an alternate construction of the fourth embodiment, the flow valve 420 may also be used in combination with a two-stage gas valve 450' (not shown), such as for example the 36G Gemini Two-Stage gas valve manufactured by White-Rodgers, a Division of Emerson Electric Co. In this alternate construction of the fourth embodiment, the combination of a flow valve 420 with a two-stage gas valve 450' can yield multiple flow rates for multi-stage firing rates in a heating application. The two stage gas valve 450' would be capable of producing first and second flow rates independent of and substantially unaffected by the flow valve 420 when in the first open position, to provide a first high flow rate and a second reduced flow rate. When the solenoid 430 of the flow valve 420 is operated to produce a second open position, the first and second flow rates of the gas valve will be substantially reduced to provide a third reduced flow rate and a fourth reduced flow rate. Thus, this fifth embodiment of a flow valve in combination with a two-stage gas valve provides for four flow rates, at least two of which are substantially unaffected by the flow valve 420.

In yet another alternate construction of the fourth embodiment, the solenoid operator of the flow valve may comprise a voice coil operator in place of a solenoid. The voice coil's displacement varies with the voltage applied to the voice coil, such that the displacement of operator, and the damper element, may be controlled by varying the voltage to the voice coil. The use of a voice coil in any of the prior disclosed embodiments would allow for variably displacing the damper element in numerous positions between the first position and the second position.

Figure 5:
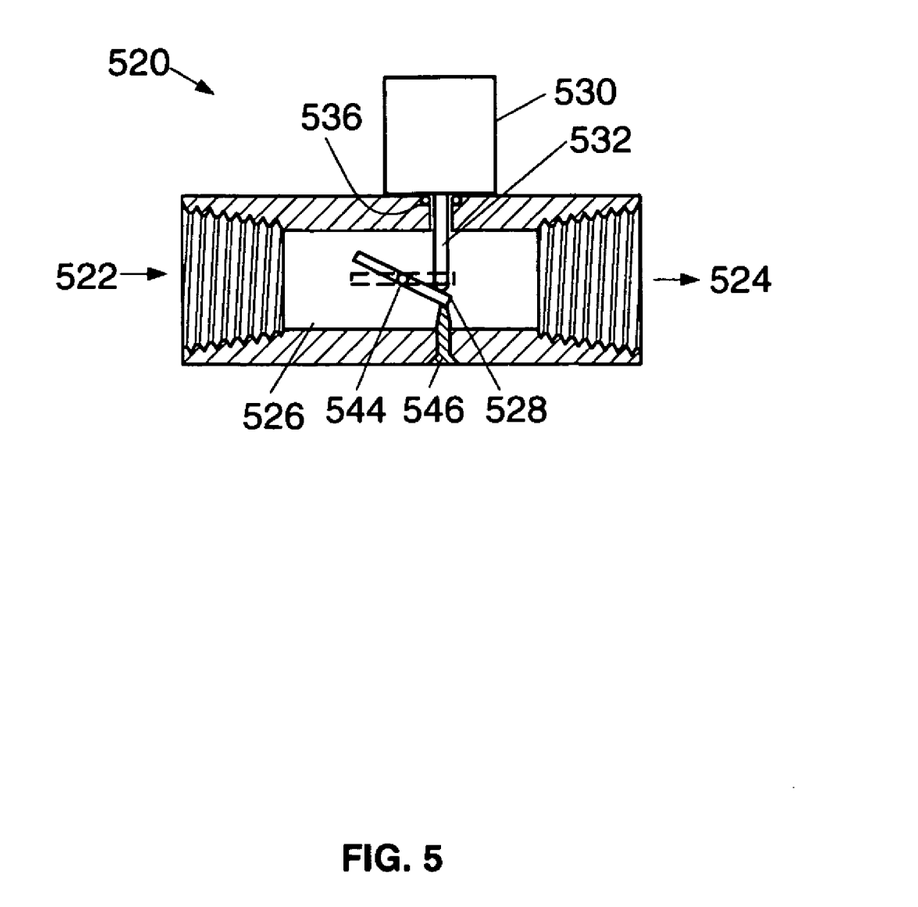
FIG. 5 is a cross-sectional side view of a fifth embodiment of a flow valve in accordance with the principles of the present invention.

A fifth embodiment of a variable flow rate valve in accordance with the principles of the present invention is generally shown as 520 in FIG. 5. The flow valve 520 has an inlet 522, an outlet 524, and a passage way 526 therethrough. The flow valve 520 further comprises a damper element 528 pivotally arranged within the passageway 526 that is movable between a first maximum open position in which fluid flow through the passageway is substantially unaffected by the damper element 528, and a second minimum position in which fluid flow through the passageway is substantially reduced by the damper element 528.

In this embodiment of a variable flow rate valve, a displacement device 532 having a movable operator or shaft 530 is provided for engaging the damper element 528. The valve may further comprise a spring for biasing the damper element 528 against the operator 530. The displacement device in this embodiment is preferably a stepper motor that is capable of extending or retracting the operator 530 to a number of variable displacement positions. The stepper motor 532 when operated to fully retract the operator 530 permits movement of the damper element 528 to its first maximum "open" position shown as a dashed line in FIG. 5. When the operator 530 is fully extended by the stepper motor, the operator 530 establishes a minimum or substantially restricted flow position of the damper element 528. Where a spring for biasing the damper element 528 against the operator 530 is used, such a spring may be a torsion spring. The torsion spring may be configured to secure the damper element 528, and to contact an inner surface of the flow valve 520 to bias the damper element against the operator 530. The damper element of the flow valve 520 includes a first maximum position that is generally parallel with the passage way 526 through the valve, such that the resulting first flow rate through the valve is substantially unaffected when the valve is in this first open position. Thus, the flow rate (at about 3.5 inches of water) exiting a gas valve in connection with the flow valve 520 is substantially unaffected by the flow valve 520, such that a first flow rate at about 3.5 inches of water pressure is provided when the damper element is in the first position. Alternatively, the flow rate may be substantially unaffected such that the flow rate through the valve is not reduced by more than that which may be noticeably measured, such as 0.1 inches of water pressure. Unlike other throttle valves that produce a relatively low resistance to flow through the valve, the present valve does not necessitate readjustment of the gas valve pressure setting to allow for the relatively low resistance of a throttle valve. The design of this embodiment in its most open position allows the flow valve 520 to be used in combination with a gas valve 50, such that the flow rate is substantially unaffected and does not require any readjustment of the gas valve's outlet pressure or flow rate settings.

When the stepper motor 532 of this fifth embodiment is actuated to extend the operator, the operator or shaft 530 is movable in a direction towards the position shown in solid lines in FIG. 5. An adjustable stop 546 is provided for adjustably limiting the movement of the damper element 528 to establish an adjustable minimum position of the damper element 528. In this embodiment, the adjustable stop 546 is preferably a screw that may be adjusted to vary the maximum amount of rotation of the damper element 528. The screw 546 may be adjusted to change the second position of the damper element 528 to vary the amount of restriction of fluid flow through the valve as desired. Thus, a substantially lower adjustable second flow rate through the valve is produced when the valve is in this minimum open position. The stepper motor accordingly is operable to pivotally move the damper element 528 to one or more positions between the maximum position and minimum position, to vary the fluid flow rate through the valve. When combined with a gas valve 550, the adjustment screw may be adjusted to provide a minimum flow rate in the range of 1.4 inches of water pressure to 2.9 inches of water pressure.

In the fifth embodiment, the variable flow rate valve 520 may also be used in combination with a gas valve (not shown), such as for example the 36G Gemini gas valve manufactured by White-Rodgers, a Division of Emerson Electric Co. In this fifth embodiment, the combination of a variable output flow rate valve 520 with a gas valve can yield multiple flow rates for multi-stage firing rates in a heating application.

In an alternate construction of the fifth embodiment, the displacement device 532 may comprise a voice coil operator in place of a stepper motor. The voice coil's displacement varies with the voltage applied to the voice coil, such that the displacement of operator 530 may be controlled by varying the voltage to the voice coil 532. Likewise, a rotary solenoid operator could be employed to achieve the same function.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A valve having an inlet, an outlet, and a passageway therebetween, the valve comprising:
   a damper element pivotally arranged within the passageway, the damper element being pivotally movable between a first position in which fluid flow through the passageway is substantially unaffected by the damper element, and at least a second position in which fluid flow through the passageway is substantially reduced by the damper element; and
   a solenoid having a moveable operator, wherein the damper element is engaged with the moveable operator and in said first position when the solenoid is not actuated, and the damper element pivotally moves to said second position against a first adjustable stop when the solenoid is actuated; and
   a first spring for biasing the moveable operator towards engagement with a second stop that limits the movement of the movable operator towards the damper; and
   a second spring, which biases the damper element to engage the moveable operator for establishing said first position when the solenoid is not actuated, and which biases the damper element against the first adjustable stop to establish said second position when the solenoid is actuated.

2. The valve of claim 1 wherein the moveable member engages the damper element to move the damper element into engagement with the adjustable stop to establish said second position.

3. The valve of claim 1 wherein the operator does not engage the damper element when the solenoid is actuated.

4. The valve of claim 1 wherein the adjustable stop comprises a screw that engages the damper element.

5. A valve having an inlet, an outlet, and a passageway therebetween, the valve comprising:
   a damper element pivotally arranged within the passageway, the damper element being pivotal between a first position in which fluid flow through the passageway is substantially unaffected by the damper element, and at least a second position in which fluid flow through the passageway is substantially reduced by the damper element, said damper element having first and second surfaces on the damper element, wherein an end portion of the operator engages the first surface on the damper element to move the damper element to said first position, and the end portion of the operator engages a second surface of the damper element to move the damper element to the second position;
   an adjustable stop for adjustably limiting the pivotal movement of the damper element to adjustably vary the second position of the damper element;
   a solenoid having an operator for engaging and moving the damper element to said position when the solenoid is actuated; and
   a spring for biasing the solenoid operator to move the damper element to said second position against the adjustable stop when the solenoid is not actuated.

6. The valve of claim 5 further comprising a second stop that limits the travel of the operator when the solenoid is actuated, for establishing the first position of the damper element.

7. The valve of claim 5 wherein the spring biases the solenoid operator against the damper element to pivot the damper element into engagement with the adjustable stop for establishing the second position of the damper element when the solenoid is not actuated.

8. A valve having an inlet, an outlet, and a passageway therebetween, the valve comprising:
   a damper element pivotally arranged within the passageway, the damper element being pivotal between a first position in which fluid flow through the passageway is substantially unaffected by the damper element, and at least a second position in which fluid flow through the passageway is substantially reduced by the damper element;

an adjustable stop for adjustably limiting the pivotal movement of the damper element to adjustably vary the second position of the damper element;

a solenoid having an operator for engaging and moving the damper element to said first position when the solenoid is actuated; and a spring for biasing the solenoid operator to move the damper element to said second position against the adjustable stop when the solenoid is not actuated; and a second spring for biasing the damper element away from engagement with the adjustable stop and towards the operator, to hold the damper element in the first position against the operator when the solenoid is actuated.

9. The valve of claim 8 wherein the spring is a torsion spring.

10. A variable flow valve in combination with a gas valve having an inlet and an outlet, the combination comprising:

a flow valve having an outlet, an inlet in connection with the outlet of the gas valve, and a passageway extending between the inlet and outlet of the flow valve;

a damper element pivotally arranged within the passageway, the damper element being movable to one or more positions between a maximum position in which the fluid flow rate through the passageway is substantially unaffected by the damper element, and a minimum position in which the fluid flow rate through the passageway is substantially reduced by the damper element;

an adjustable stop for adjustably limiting the pivotal movement of the damper element to adjustably vary the minimum position of the damper element;

a stepper motor having an operator for engaging and moving the damper element, the stepper motor being operable to pivotally move the damper element to any one of said one or more positions between the maximum position and minimum position of the damper element, to vary the fluid flow rate through the valve;

wherein the fluid flow rate through the outlet of the gas valve is substantially unaffected by the flow valve when the damper element is in its maximum position, such that the gas valve does not require any flow rate adjustment.

* * * * *